(12) United States Patent
Myers et al.

(10) Patent No.: US 7,965,827 B2
(45) Date of Patent: Jun. 21, 2011

(54) METHODS, SYSTEMS, AND PRODUCTS FOR PURCHASING PRE-PAID SERVICES

(75) Inventors: Jerome Myers, Douglasville, GA (US); John Ruckart, Atlanta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1203 days.

(21) Appl. No.: 11/495,912

(22) Filed: Jul. 29, 2006
(Under 37 CFR 1.47)

(65) Prior Publication Data
US 2008/0046357 A1 Feb. 21, 2008

(51) Int. Cl.
*H04M 15/00* (2006.01)
(52) U.S. Cl. ............ 379/114.2; 379/121.01; 455/406; 455/408
(58) Field of Classification Search .......... 379/111, 379/114.01, 114.15, 114.16, 114.19, 114.2, 379/121.01; 705/14.37, 14.38; 455/405–409
See application file for complete search history.

(56) References Cited

U.S. PATENT DOCUMENTS

| | | | |
|---|---|---|---|
| 5,572,442 A | 11/1996 | Schulhof et al. | |
| 5,794,210 A | 8/1998 | Goldhaber et al. | |
| 5,903,633 A * | 5/1999 | Lorsch | 379/114.2 |
| 5,933,811 A | 8/1999 | Angles et al. | |
| 5,970,467 A | 10/1999 | Alavi | |
| 6,049,779 A | 4/2000 | Berkson | |
| 6,070,147 A | 5/2000 | Harms et al. | |
| 6,185,545 B1 | 2/2001 | Resnick et al. | |
| 6,212,262 B1 | 4/2001 | Kamel | |
| 6,216,111 B1 | 4/2001 | Walker et al. | |
| 6,233,564 B1 | 5/2001 | Schulze, Jr. | |
| 6,236,975 B1 | 5/2001 | Boe et al. | |
| 6,415,142 B1 | 7/2002 | Martineau | |
| 6,446,044 B1 | 9/2002 | Luth et al. | |
| 6,457,640 B2 | 10/2002 | Ramachandran et al. | |
| 6,477,509 B1 | 11/2002 | Hammons et al. | |
| 6,633,850 B1 | 10/2003 | Gabbard et al. | |
| 6,754,635 B1 | 6/2004 | Hamlin et al. | |
| 6,816,721 B1 | 11/2004 | Rudisill | |
| 6,823,172 B1 | 11/2004 | Forrest | |
| 6,840,444 B2 | 1/2005 | Pierce et al. | |
| 6,889,054 B2 | 5/2005 | Himmel et al. | |
| 6,892,387 B1 | 5/2005 | Lee | |
| 6,907,418 B2 | 6/2005 | Shin et al. | |
| 6,934,529 B2 | 8/2005 | Bagoren et al. | |
| 6,934,664 B1 | 8/2005 | Webb et al. | |
| 6,959,285 B2 | 10/2005 | Stefanik et al. | |
| 6,973,476 B1 | 12/2005 | Naden et al. | |
| 7,016,877 B1 | 3/2006 | Steele et al. | |
| 7,356,327 B2 * | 4/2008 | Cai et al. | 455/406 |
| 7,440,563 B2 | 10/2008 | Baiz Matuk | |
| 7,472,822 B2 * | 1/2009 | Guest et al. | 235/375 |
| 7,478,056 B1 * | 1/2009 | Lu | 705/26.8 |
| 2001/0013120 A1 | 8/2001 | Tsukamoto | |
| 2001/0034647 A1 | 10/2001 | Marks et al. | |
| 2001/0037360 A1 | 11/2001 | Ekkel | |
| 2001/0056374 A1 | 12/2001 | Joao | |

(Continued)

*Primary Examiner* — Binh K Tieu
(74) *Attorney, Agent, or Firm* — Scott P. Zimmerman PLLC

(57) ABSTRACT

Methods, systems, and products are disclosed for purchasing prepaid services. A request to purchase a prepaid service is received. The request includes a service number that uniquely identifies the prepaid service and a device number that uniquely identifies a requesting device. The service number and the device number are communicated for activation, and a verification message is received indicating the prepaid service has been successfully activated.

15 Claims, 6 Drawing Sheets

U.S. PATENT DOCUMENTS

| | | |
|---|---|---|
| 2002/0019774 A1 | 2/2002 | Kanter |
| 2002/0077130 A1 | 6/2002 | Owensby |
| 2003/0008636 A1* | 1/2003 | McGregor et al. ............ 455/410 |
| 2003/0018525 A1 | 1/2003 | Joao |
| 2003/0033243 A1 | 2/2003 | Baker et al. |
| 2003/0050837 A1 | 3/2003 | Kim |
| 2004/0002359 A1 | 1/2004 | Deas et al. |
| 2004/0054597 A1 | 3/2004 | Gulliver et al. |
| 2004/0088183 A1 | 5/2004 | Nakanishi et al. |
| 2004/0088250 A1 | 5/2004 | Bartter et al. |
| 2004/0118914 A1* | 6/2004 | Smith et al. ................... 235/380 |
| 2004/0133511 A1 | 7/2004 | Smith et al. |
| 2004/0162732 A1 | 8/2004 | Rahim et al. |
| 2004/0230489 A1 | 11/2004 | Goldthwaite et al. |
| 2004/0235524 A1 | 11/2004 | Abuhamdeh |
| 2004/0255322 A1 | 12/2004 | Meadows et al. |
| 2005/0061872 A1 | 3/2005 | Paschini et al. |
| 2005/0105704 A1 | 5/2005 | Harrison et al. |
| 2005/0108092 A1 | 5/2005 | Campbell et al. |
| 2005/0165640 A1 | 7/2005 | Kotorov |
| 2006/0217106 A1* | 9/2006 | Davidson et al. ............. 455/405 |
| 2007/0067215 A1 | 3/2007 | Agarwal et al. |
| 2007/0244752 A1 | 10/2007 | Bayne |
| 2007/0260515 A1 | 11/2007 | Schoen et al. |
| 2008/0045195 A1 | 2/2008 | Coregiano |
| 2008/0195460 A1 | 8/2008 | Varghese |
| 2008/0242355 A1* | 10/2008 | Yu et al. ........................ 455/558 |
| 2010/0049617 A1* | 2/2010 | Chakiris et al. ................. 705/21 |

* cited by examiner

METHODS, SYSTEMS, AND PRODUCTS FOR PURCHASING PRE-PAID SERVICES

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to data processing and, more particularly, to activation of prepaid services.

Purchasing prepaid services can be cumbersome. Many people purchase prepaid calling minutes, prepaid Internet-access services, and/or prepaid service units. When the prepaid service has a nearly zero balance, more credit must be purchased and applied to the account. A prepaid wireless customer, for example, commonly purchases a prepaid card from a merchant's retail location. The customer then uses his or her wireless phone to call an activation number. The customer then responds to Interactive Voice Response (IVR) prompts and enters a personal identification number (PIN) from the prepaid card. This manually-input information associates the customer's wireless phone to the prepaid account. This conventional activation process provides, at best, a mediocre customer experience. Moreover, customers frequently make errors when manually entering activation information. What is needed, then, are methods, systems, and products that reduce the need for manual entry of activation information, thus reducing the potential for error and improving the customer's experience.

SUMMARY

The aforementioned problems, and other problems, are reduced, according to exemplary embodiments, using methods, systems, and products that automate the purchase of prepaid services. When a customer desires to purchase prepaid services, exemplary embodiments automate that activation process. Exemplary embodiments automatically collect and associate a prepaid service number and a device number. The service number may be any alphanumeric identifier or code that uniquely identifies the prepaid service. The device number is likewise any alphanumeric identifier or code that uniquely identifies the customer's requesting communications device. Exemplary embodiments thus automatically identify both the prepaid service and the customer's communications device, thus relieving the customer of any need for further activation. The user need not enter a PIN or dial into an IVR interface to complete activation. Exemplary embodiments thus operate on the user's behalf and greatly simplify the activation process.

The exemplary embodiments describe a method for purchasing prepaid services. A request to purchase a prepaid service is received. The request includes a service number that uniquely identifies the prepaid service and a device number that uniquely identifies a requesting device. The service number and the device number are communicated for activation, and a verification message is received indicating the prepaid service has been successfully activated.

In another of the embodiments, a system is disclosed for purchasing prepaid services. An activation application is stored in memory, and a processor communicates with the memory. The processor receives a request to purchase a prepaid service, the request comprising a service number that uniquely identifies the prepaid service and a device number that uniquely identifies a requesting device. The processor communicates the service number and the device number for activation. The processor receives a verification message that the prepaid service has been successfully activated.

In yet another embodiment, a computer program product is also disclosed for purchasing prepaid services. The computer program product stores computer code for receiving a request to purchase a prepaid service. The request comprises a service number that uniquely identifies the prepaid service and a device number that uniquely identifies a requesting device. The service number and the device number are communicated for activation, and a verification message is received indicating the prepaid service has been successfully activated.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

Figure 1:
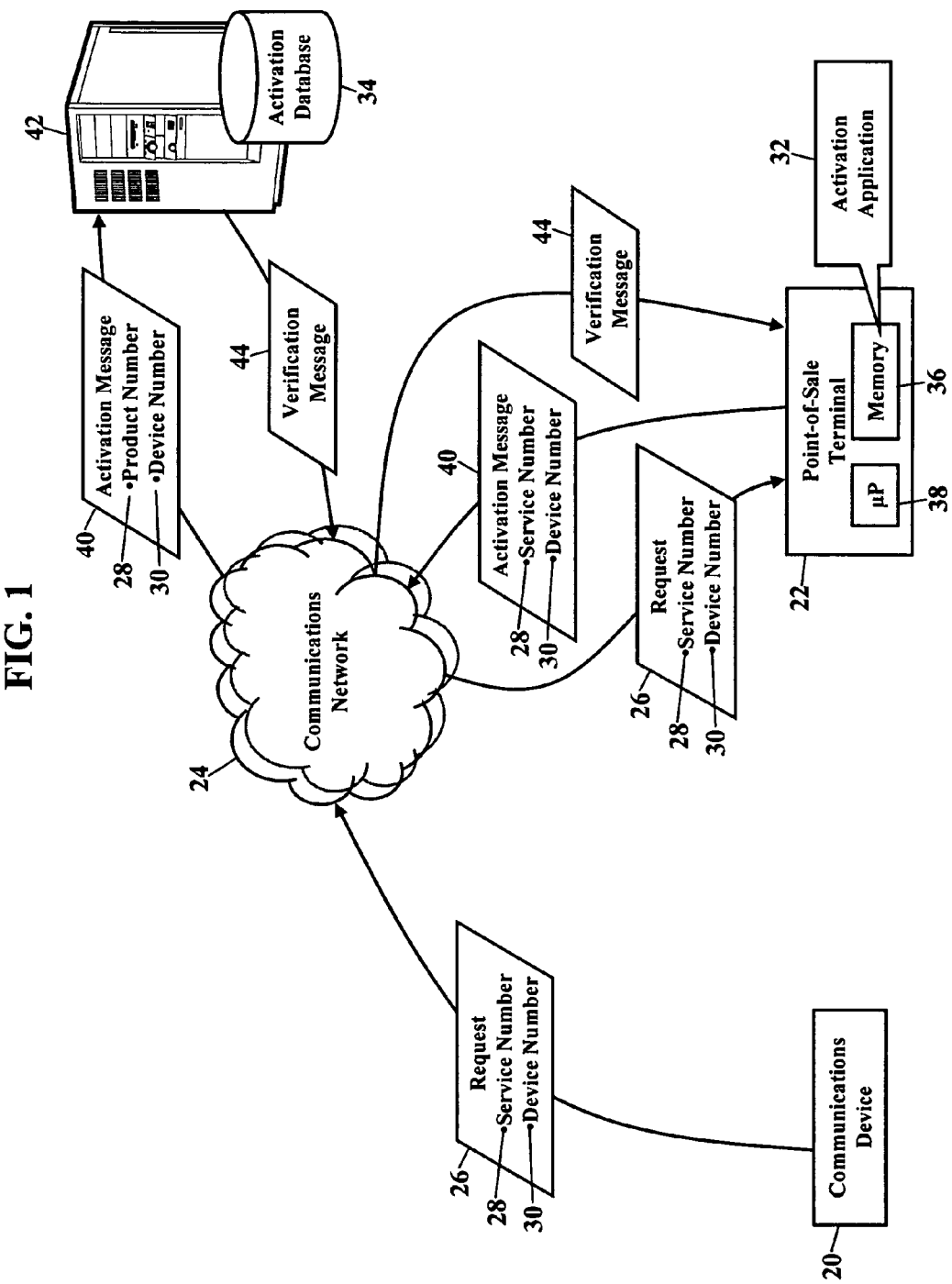
FIG. 1 is a simplified schematic illustrating a network environment in which exemplary embodiments may be implemented.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIG. 1 is a simplified schematic illustrating a network environment in which exemplary embodiments may be implemented. A user's communications device 20 communicates with a point-of-sale terminal 22 via a communications network 24. Although the user's communications device 20 is generically shown, the communications device 20, as will be later explained, may be any computer, personal digital assistant, cordless/cellular/IP phone, or any other processor-controlled device. Whatever the user's communications device 20, the user's communications device 20 wirelessly or wiredly communicates a request 26 to the point-of-sale terminal 22. The request 26 seeks to purchase, activate, or add value to a prepaid service. The request 26, for example, may request activation of prepaid calling minutes, prepaid Internet-access services, prepaid credits for downloadable media (such as music, movies, pictures, software, e-books, and ringtones), and/or prepaid service units. The request 26 may additionally or alternatively request a monetary or service credit be applied to a prepaid service. The request 26 comprises a service number 28 and a device number 30. The service number 28 may be a SKU number, a bar code number, an RFID tag/label number, or any other alphanumeric identifier or code that uniquely identifies the prepaid service. The device number 30 is any alphanumeric identifier or code that uniquely identifies the user's requesting communications device 20.

The point-of-sale terminal 22 receives the request 26. An activation application 32 then initiates communication with an activation database 34. The activation application 32 is a set of processor-executable instructions that are stored in memory 36 of the point-of-sale terminal 22. The activation application 32 is a software engine that instructs a processor ("μP") 38, ASIC, or other device to send an activation message 40 to the activation database 34. The activation message 40 may include the service number 28 and the device number 30.

The activation database 34 receives the activation message. 40 and performs an activation. The activation database 34 is stored in the memory of an activation server 42. The activation database 34 associates the service number 28 with the device number 30. The activation database 34 thus activates the user's communications device 20 for the prepaid service. The activation database 34 thus maintains a listing of devices that are prepaid and approved for calling minutes, service minutes, service credits, or any other prepaid service. When the activation database 34 associates the service number 28 with the device number 30, the activation database 34 may send a verification message 44. The verification message 44 verifies that the service number 28 and the device number 30 have been successfully activated in the activation database 34.

The point-of-sale terminal 22 receives the verification message 44. The activation application 32 may inspect the verification message 44 to ensure activation was successful. If activation was unsuccessful, the activation application 32 may attempt to send a second, redundant activation message 40, or the activation application 32 may cancel the user's request 26.

The point-of-sale terminal 22 may wirelessly receive the service number 28 and/or the device number 30. FIG. 1 illustrates the request 26 comprising both the service number 28 and/or the device number 30, yet either number may be separately received. The user's communications device 20, for example, may wirelessly communicate the device number 30, while the point-of-sale terminal 22 receives the service number 28 via a magnetically encoded card. The device number 30, in fact, may be wirelessly received via an RFID tag/label or via manual entry on a keypad or other user interface. The device number 30 may be obtained by any optical, magnetic, wireless, electronic, and/or manual means.

Exemplary embodiments thus automate the activation process for prepaid services. The service number 28 and/or the device number 30 are automatically collected and associated in the activation database 34. Exemplary embodiments thus identify both the prepaid service and the user's communications device 20. Because the point-of-sale terminal 22 captures the service number 28 and/or the device number 30, the user is relieved of any need for activation. The user need not enter a PIN or dial into an IVR interface to complete activation. The activation application 32 operates on the user's behalf and greatly simplifies the activation process.

Exemplary embodiments may be applied regardless of networking environment. The user's communications device 20 and the point-of-sale terminal 22 may operate using wired or wireless principles. The communications network 24 may be a cable network operating in the radio-frequency domain and/or the Internet Protocol (IP) domain. The communications network 24 may have POTS components and/or features. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network or communications device, regardless of physical componentry, physical configuration, or communications standard(s).

The user's communications device 20, the point-of-sale terminal 22, and the activation server 42 are only simply illustrated. Because the architecture and operating principles of computers, servers, communications devices, and other processor-controlled devices are well known, the hardware and software components are not further shown and described. If, however, the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Additionally, some aspects of prepaid transactions are known, so this disclosure does not greatly explain the known details. If the reader desires more details, the reader is invited to consult the following sources, all incorporated herein by reference in their entirety: U.S. Pat. No. 5,572,442 to Schulhof et al.; U.S. Pat. No. 6,457,640 to Ramachandran et al.; U.S. Pat. No. 6,823,172 to Forrest; U.S. Pat. No. 6,840,444 to Pierce et al.; U.S. Pat. No. 6,959,285 to Stefanik et al.; U.S. Pat. No. 6,973,476 to Naden et al.; Published U.S. Patent Application 2001/0013120 to Tsukamoto; Published U.S. Patent Application 2001/0037360 to Ekkel; Published U.S. Patent Application 2003/0033243 to Baker et al.; Published U.S. Patent Application 2004/0002359 to Deas et al.; Published U.S. Patent Application 2004/0054597 to Gulliver et al.; and Published U.S. Patent Application 2004/0230489 to Goldthwaite et al.

Figure 2:
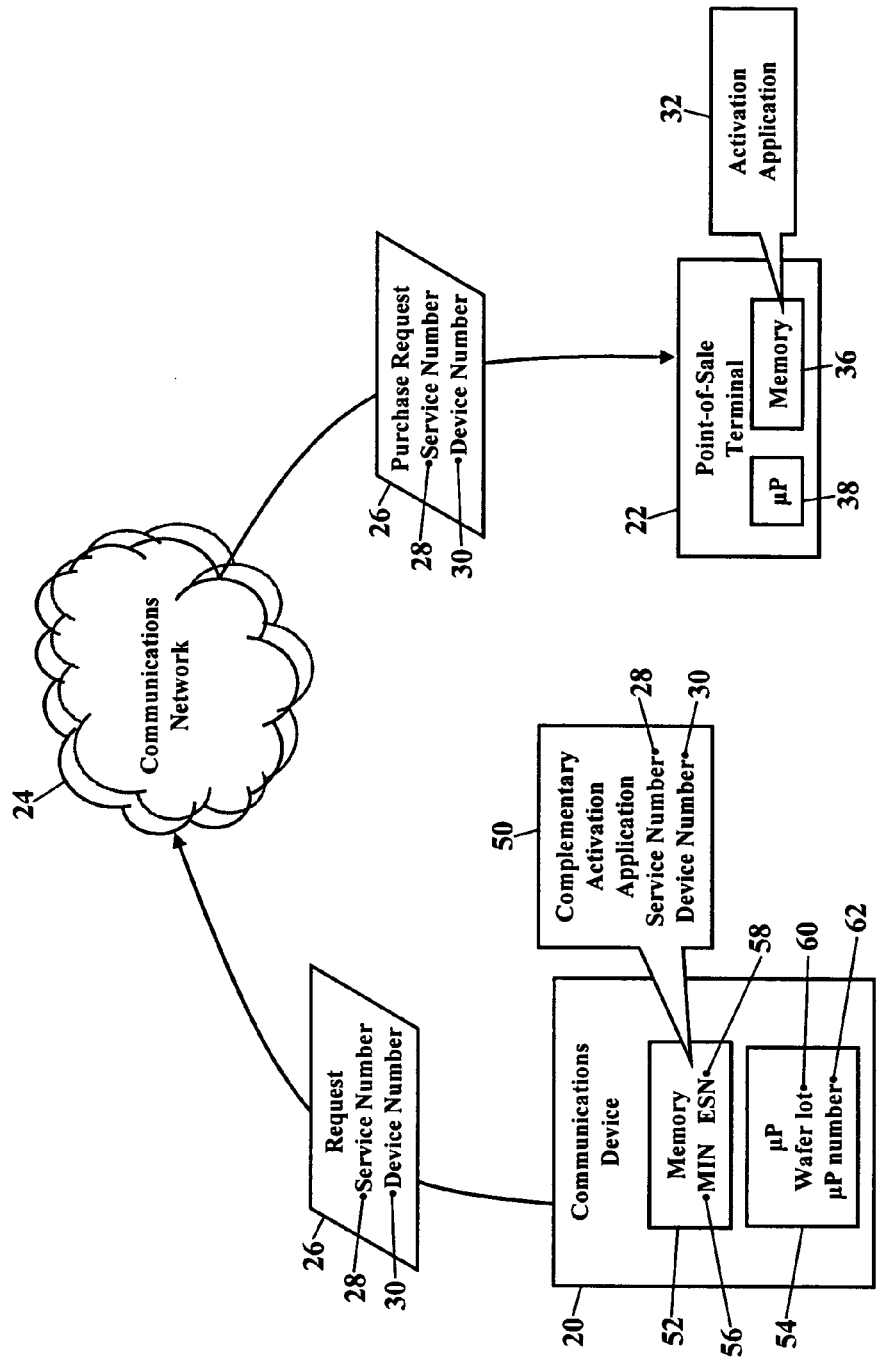
FIG. 2 is a more detailed schematic illustrating the user's communications device 20, according to more exemplary embodiments.

FIG. 2 is a more detailed schematic illustrating the user's communications device 20, according to more exemplary embodiments. Here a complementary activation application 50 operates in the user's communications device 20. The activation application 32 and the complementary activation application 50 may operationally cooperate to communicate the request 26. The complementary activation application 50 is a set of processor-executable instructions that are stored in memory 52 of the user's communications device 20. The complementary activation application 50 is a software engine that instructs a device processor 54 to send the request 26. The complementary activation application 50 instructs the device processor 54 to retrieve the service number 28 and/or the device number 30 from the memory 52. The complementary activation application 50 then instructs the device processor 54 to send the service number 28 and/or the device number 30 with the request 26.

The service number 28 uniquely identifies the prepaid service. The service number 28 is any alphanumeric combination that is associated with the prepaid service. Because the user may activate multiple prepaid services (such as cellular calling minutes, Internet access minutes, and text messaging minutes), each prepaid service may have an associated service number that differentiates it from other prepaid services. Suppose, for example, that the user purchases a prepaid calling card for cellular service. The service number 28 may be represented as a bar code on the calling card. If the user's communications device 20 has the capability to optically scan bar codes, the complementary activation application 50 instructs the device processor 54 to obtain the service number 28 and to store that service number in the memory 52. The service number 28 may alternatively be magnetically encoded on the calling card. If the user's communications device 20 has the capability to electromagnetically read the card, the user may "swipe" the calling card, thus allowing the device processor 54 to obtain the service number 28. The service number 28 may alternatively be wirelessly obtained from an RFID tag/label. The service number 28 may also be obtained via manual entry on a keypad or other user interface. The service number 28 may be obtained by any optical, magnetic, wireless, electronic, and/or manual means. However the service number 28 is obtained, the complementary activation application 50 instructs the device processor 54 to send the service number 28 with the request 26.

The device number 30 uniquely identifies the requesting communications device 20. The device number 30 is retrieved from the memory 52, and the complementary activation application 50 instructs the device processor 54 to send the device number 30 with the request 26. The device number 30 is any alphanumeric identifier or code that is associated with, or assigned to, the user's communications device 20. The device number 30, for example, may be a Mobile Identification Number (MIN) 56 associated with the user's communications device 20. The device number 30 may additionally or alternatively include a component or device serial number (such as an Electronic Serial Number or "ESN" 58) associated with the user's communications device 20. The device number 30 may additionally or alternatively include a serial number, account number, or any other number that uniquely identifies a Subscriber Identity Module (SIM) associated with the user's communications device 20. The device number 30 may additionally or alternatively include a wafer lot number 60 and/or a microprocessor number 62. The wafer lot number 60 identifies a wafer lot from which the device processor 54 was manufactured. The microprocessor number 62 uniquely identifies the device processor 54 manufactured from the wafer lot and operating in the user's communications device 20. Whatever the device number 30, the complementary activation application 50 instructs the device processor 54 to send the device number 30 with the request 26.

Figure 3:
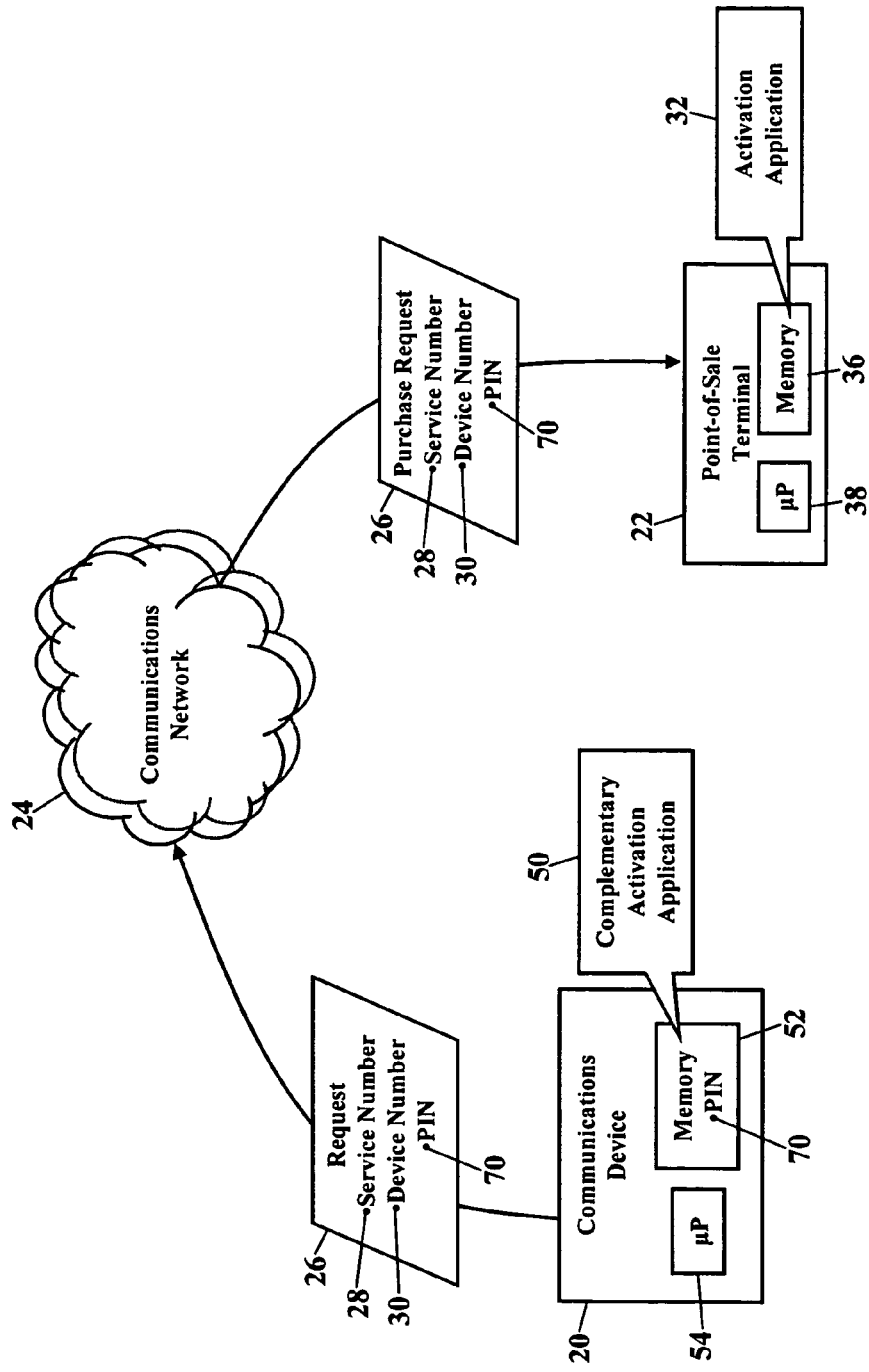
FIG. 3 is another detailed schematic illustrating prepaid activation, according to more exemplary embodiments.

FIG. 3 is another detailed schematic illustrating prepaid activation, according to more exemplary embodiments. Here the complementary activation application 50 obtains and sends a personal identification number (PIN) or code 70 associated with the service number. Some prepaid services may require a PIN or code to activate the service. Some prepaid calling cards, for example, require a PIN for activation. Even though the service number 28 may uniquely identify the prepaid service, the PIN or code 70 helps reduce or prevent fraud. The PIN or code 70 may be obtained by scanning a bar code, by sensing an electromagnetic strip, by wireless receipt, or by electronic input via a keypad or other user interface. The PIN or code 70 may be obtained by any optical, magnetic, wireless, electronic, and/or manual means. However the PIN or code 70 is obtained, the complementary activation application 50 may instruct the device processor 54 to send the PIN or code 70 with the request 26. The complementary activation application 50 may alternatively instruct the device processor 54 to send the PIN or code 70 in a subsequent or different message.

Figure 4:
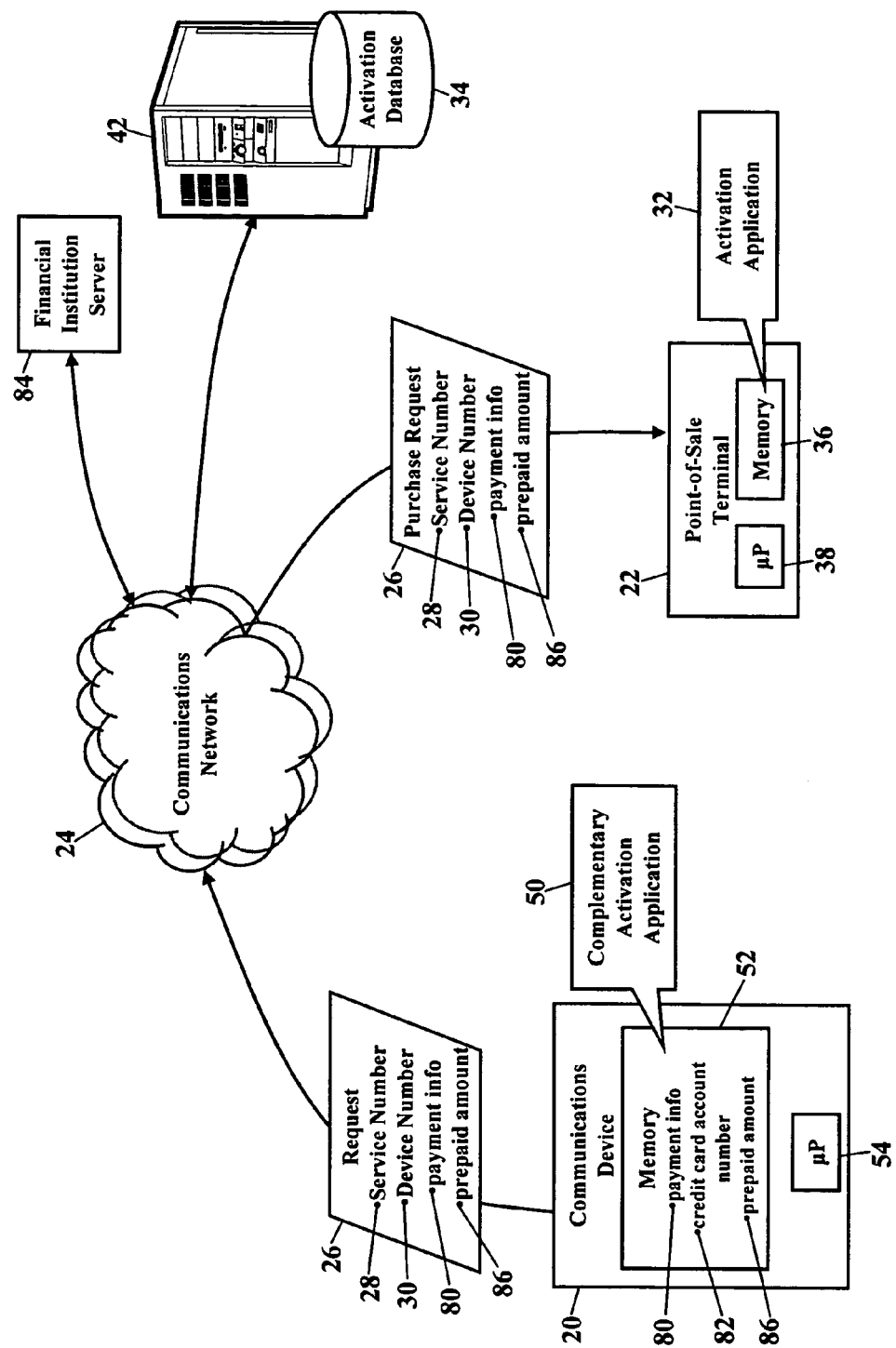
FIG. 4 is another detailed schematic illustrating prepaid activation, according to even more exemplary embodiments.

FIG. 4 is another detailed schematic illustrating prepaid activation, according to even more exemplary embodiments. Here the user's communications device 20 may also retrieve and communicate payment information 80. Because the user is activating a prepaid service, the service provider may require prepayment. The complementary activation application 50, then, may store the payment information 80 in the memory 52 of the user's communications device 20. When activation is desired or required, the complementary activation application 50 sends the payment information 80 to the point-of-sale terminal 22. FIG. 4 illustrates the payment information 80 as perhaps including a credit card account number 82. The payment information 80, however, may additionally or alternatively include any debit or credit account number, savings or checking account number, gift coupon number, or any other alphanumeric string associated with any account or any form of payment. The complementary activation application 50 may send the payment information 80 with the request 26, or the payment information 80 may be sent in a subsequent or different message. When the activation application 32 receives the payment information 80, the activation application 32 may communicate with a financial institution's server 84 to process payment for the prepaid service. The activation application 32 may additionally or alternatively communicate the payment information 80 to the activation server 42, thus "handing off" the payment processing to the activation server 42. The activation server 42 would then interact with the financial institution's server 84 to process payment for the prepaid service.

The payment information 80 may be obtained by any means. The payment information 80 may be obtained by scanning a bar code, by sensing an electromagnetic strip, by wireless receipt, or by electronic input via a keypad or other user interface. The payment information 80 may be obtained by optical, magnetic, wireless, electronic, and/or manual means. However the payment information 80 is obtained, the complementary activation application 50 may instruct the device processor 54 to send the payment information 80 with the request 26. The complementary activation application 50 may alternatively instruct the device processor 54 to send the payment information 80 in a subsequent or different message. The complementary activation application 50 may collect the payment information 80 (e.g., the credit card account number 82) on behalf of the user and submit or send that payment information 80 to the activation application 32. Because this information is collected and sent on the user's behalf, exemplary embodiments permit a simpler and faster activation process. Exemplary embodiments also reduce or eliminate service rejections/denials due to erroneous manual entry.

The user's communications device 20 may also communicate a prepaid amount 86. Because the user is prepaying for services, the activation application 32 operating in the point-of-sale terminal 22 may receive the prepaid amount 86. The activation application 32 may then send that prepaid amount 86 to the activation server 42 as a credit towards activation of the prepaid service. The prepaid amount 86 may be associated with the device number 30 (such as the MIN 56, the ESN 58, the wafer lot number 60, and/or the microprocessor number 62 shown in FIG. 2).

Figure 5:
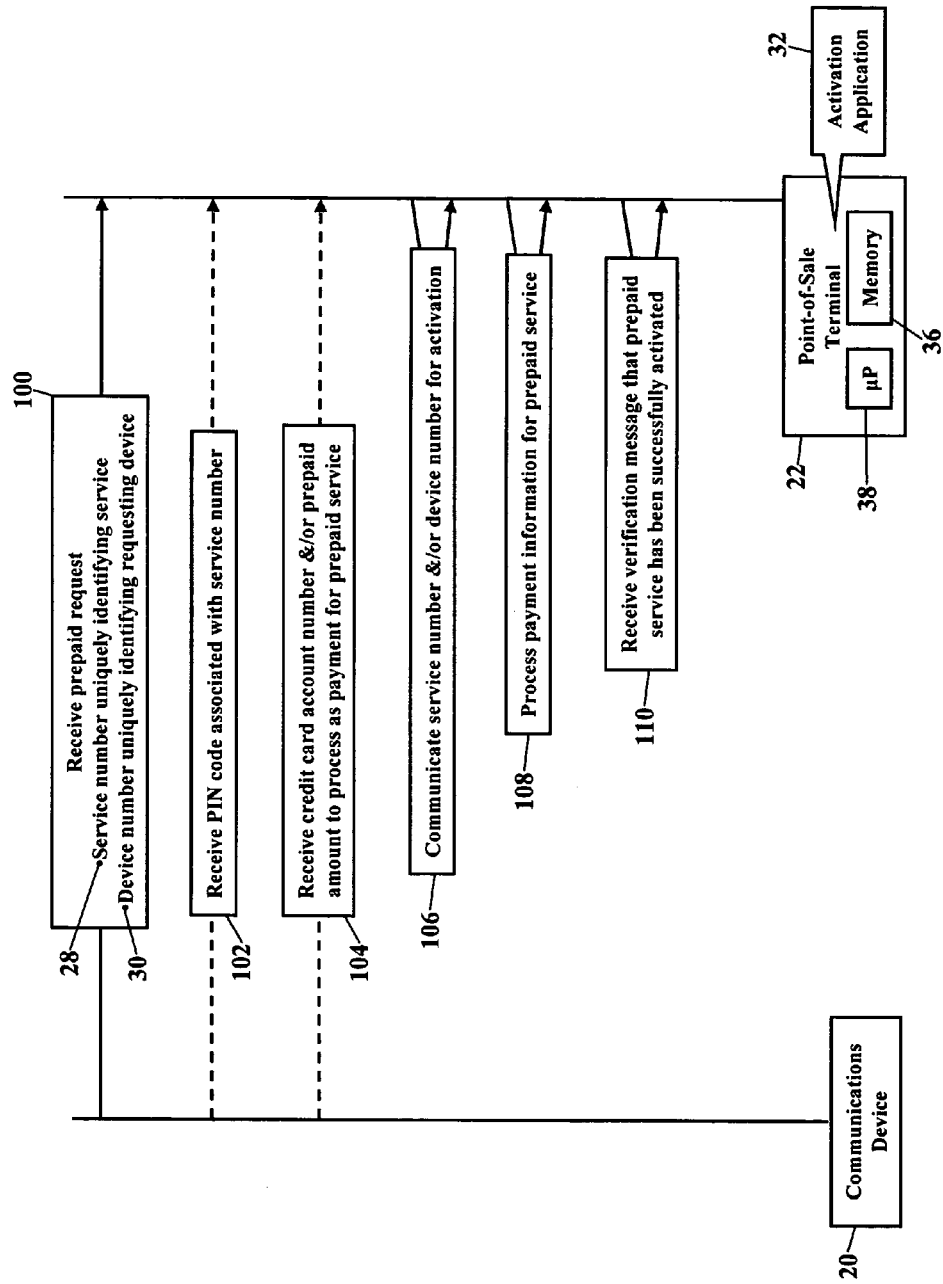
FIG. 5 is a schematic illustrating a process for purchasing and activating prepaid services, according to still more exemplary embodiments.

FIG. 5 is a schematic illustrating a process for purchasing and activating prepaid services, according to still more exemplary embodiments. The point-of-sale terminal 22 receives a request to purchase a prepaid service (Step 100). The request may comprise the service number 28 that uniquely identifies the prepaid service and the device number 30 that uniquely identifies the user's requesting communications device 20. The point-of-sale terminal 22 may also receive the PIN code associated with the service number (Step 102). The point-of-sale terminal 22 may also receive a credit card account number and a prepaid amount to process as payment for the prepaid service (Step 104). The activation application 32 operating in the point-of-sale terminal 22 communicates the service number 28 and the device number 30 for activation (Step 106). The point-of-sale terminal 22 may also process payment information for the prepaid service (Step 108). The point-of-sale terminal 22 receives a verification message that the prepaid service has been successfully activated (Step 110).

Figure 6:
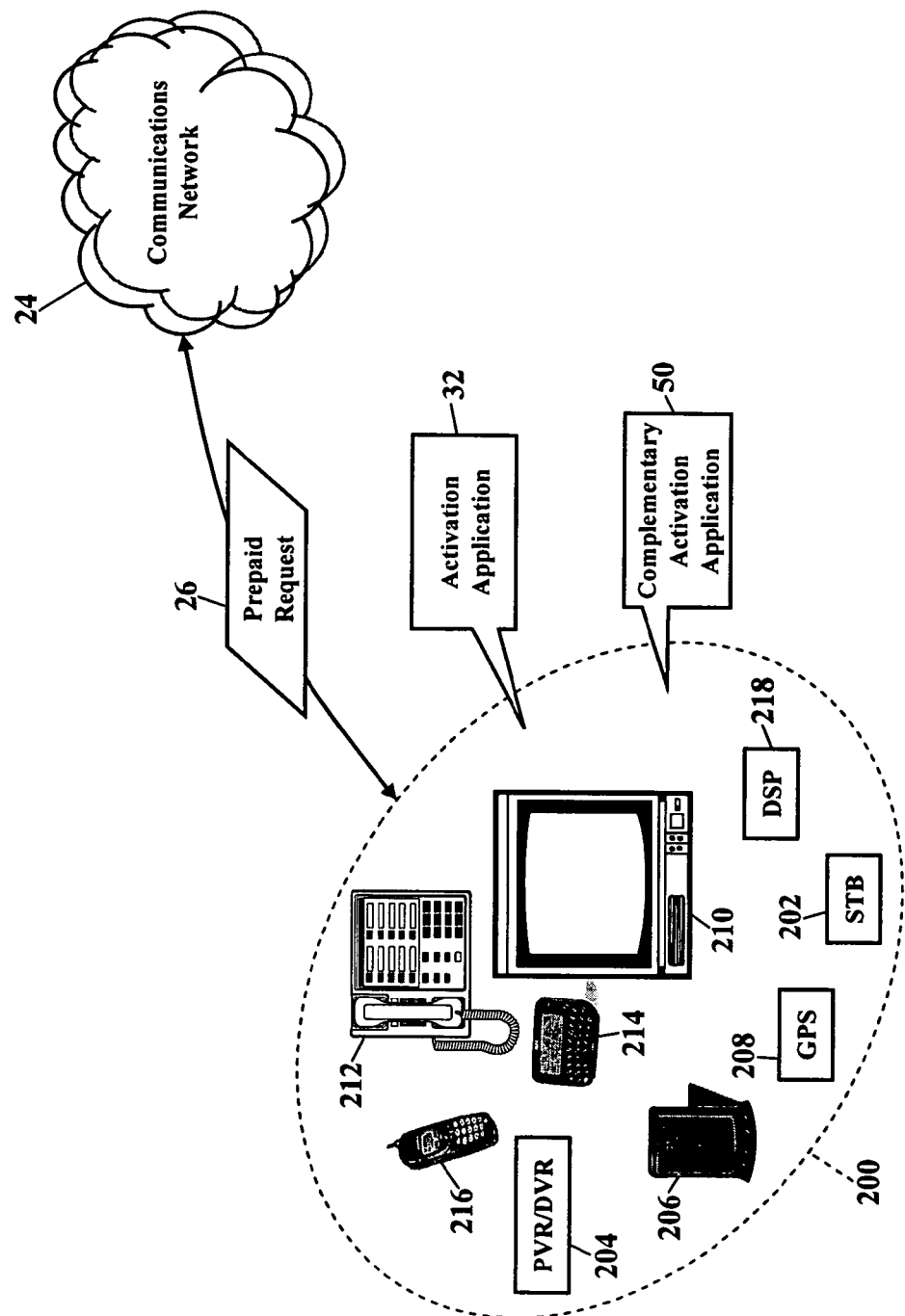
FIG. 6 depicts other possible operating environments, according to more exemplary embodiments.

FIG. 6 depicts other possible operating environments, according to more exemplary embodiments. FIG. 6 illustrates that the activation application 32 and/or the complementary activation application 50 may alternatively or additionally operate within various other communications devices 200. FIG. 6, for example, illustrates that the activation application 32 and/or the complementary activation application 50 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The communications device 200 may also include watches, radios, vehicle electronics, clocks, printers, gateways, and other apparatuses and systems. Because the architecture and operating principles of the various communications devices 200 are well known, the hardware and software componentry of the various communications devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

The activation application 32 and/or the complementary activation application 50 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the activation application 32 and/or the complementary activation application 50 to be easily disseminated. A computer program product comprises the activation application 32 and/or the complementary activation application 50 stored on the computer-readable medium. The activation application 32 and/or the complementary activation application 50 comprises computer-readable instructions/code for purchasing and activating prepaid services.

Exemplary embodiments may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for purchasing prepaid services, comprising:
    receiving a request at a point of sale terminal to purchase a prepaid service, the request comprising a service number that uniquely identifies the prepaid service, a wafer lot number that identifies a wafer lot from which a processor in an end user's requesting device was manufactured, and a prepaid amount for credit towards activation of the prepaid service;
    sending the service number, the wafer lot number, and the prepaid amount in an activation message to an activation database that stores a listing of devices approved for the prepaid service;
    storing an association in the activation database between the service number, the wafer lot number, and the prepaid amount that adds the wafer lot number to the listing of devices approved for the prepaid service; and
    sending a verification message to the point of sale terminal that indicates the prepaid service has been successfully activated for the end user's requesting device.

2. The method according to claim 1, further comprising receiving a personal identification number associated with the service number.

3. The method according to claim 1, wherein receiving the request comprises receiving a credit card account number to process as payment for the prepaid service.

4. The method according to claim 1, further comprising processing payment information for the prepaid service.

5. The method according to claim 1, further comprising receiving a microprocessor number uniquely identifying the processor manufactured from the wafer lot and operating in the end user's requesting device.

6. A system, comprising:
    a processor executing code stored in memory that causes the processor to:
    receive a request at a point of sale terminal to purchase a prepaid service, the request comprising a service number that uniquely identifies the prepaid service, a wafer lot number that identifies a wafer lot from which a processor in an end user's requesting device was manufactured, and a prepaid amount for credit towards activation of the prepaid service;
    send the service number, the wafer lot number, and the prepaid amount in an activation message to an activation database that stores a listing of devices approved for the prepaid service;
    an association in the activation database between the service number, the wafer lot number, and the prepaid amount that adds the wafer lot number to the listing of devices approved for the prepaid service; and
    send a verification message to the point of sale terminal that indicates the prepaid service has been successfully activated for the end user's requesting device.

7. The system according to claim 6, further comprising code that causes the processor to receive a personal identification number associated with the service number.

8. The system according to claim 6, further comprising code that causes the processor to receive a credit card account number to process as payment for the prepaid service.

9. The system according to claim 6, further comprising code that causes the processor to process payment information for the prepaid service.

10. The system according to claim 6, further comprising code that causes the processor to receive a wafer lot number and a microprocessor number uniquely identifying the processor manufactured from the wafer lot and operating in the end user's requesting device.

11. A computer readable medium storing computer code for performing a method, the method comprising:
    receiving a request at a point of sale terminal to purchase a prepaid service, the request comprising a service number that uniquely identifies the prepaid service, a wafer lot number that identifies a wafer lot from which a processor in an end user's requesting device was manufactured, and a prepaid amount for credit towards activation of the prepaid service;
    sending the service number, the wafer lot number, and the prepaid amount in an activation message to an activation database that stores a listing of devices approved for the prepaid service;
    storing an association in the activation database between the service number, the wafer lot number, and the prepaid amount that adds the wafer lot number to the listing of devices approved for the prepaid service; and
    sending a verification message to the point of sale terminal that indicates the prepaid service has been successfully activated for the end user's requesting device.

12. The computer program product according to claim 11, further comprising computer code for receiving a personal identification number associated with the service number.

13. The computer program product according to claim 11, further comprising computer code for receiving a credit card account number to process as payment for the prepaid service.

14. The computer program product according to claim 11, further comprising computer code for processing payment information for the prepaid service.

15. The computer program product according to claim 11, further comprising computer code for receiving a microprocessor number uniquely identifying the processor manufactured from the wafer lot and operating in the end user's requesting device.

* * * * *